United States Patent [19]
Eddy et al.

[11] Patent Number: 6,159,588
[45] Date of Patent: Dec. 12, 2000

[54] FUSER MEMBER WITH FLUOROPOLYMER, SILICONE AND ALUMINA COMPOSITE LAYER

[75] Inventors: Clifford O. Eddy, Webster; Santokh S. Badesha; Arnold W. Henry, both of Pittsford; James B. Maliborski, Rochester; Samuel Kaplan, Walworth; Louis D. Fratangelo, Fairport; Che C. Chow, Penfield, all of N.Y.; Yu-hsing Chin, Taipei, Taiwan

[73] Assignee: Xerox Corporation, Stamford, Conn.

[21] Appl. No.: 09/160,259

[22] Filed: Sep. 25, 1998

[51] Int. Cl.[7] .......................... B32B 25/02; B32B 25/04; B32B 25/14; B32B 25/20
[52] U.S. Cl. .......................... 428/215; 428/323; 428/327; 428/328; 428/329; 428/421; 428/422; 428/447; 428/448; 399/320; 399/329; 399/330; 399/331; 399/333
[58] Field of Search .................. 428/323, 327, 428/328, 329, 421, 422, 215, 447, 448; 399/320, 329, 330, 331, 333

[56] References Cited

U.S. PATENT DOCUMENTS

| | | | |
|---|---|---|---|
| 4,257,699 | 3/1981 | Lentz | 355/3 FU |
| 4,711,818 | 12/1987 | Henry | 428/421 |
| 5,292,606 | 3/1994 | Fitzgerald | 428/35.8 |
| 5,595,823 | 1/1997 | Chen et al. | 428/421 |
| 5,729,813 | 3/1998 | Eddy et al. | 399/333 |

*Primary Examiner*—Vivian Chen
*Attorney, Agent, or Firm*—Annette Bade

[57] ABSTRACT

The present invention relates to a fuser member useful in electrostatographic, including digital apparatuses, the fuser member having a) a substrate, and b) a thermally conductive fusing layer with a fluoropolymer, a micron-sized alumina, a high surface area alumina having a particle size smaller than that of the micron-sized alumina, and crosslinked silicone particles.

28 Claims, 3 Drawing Sheets

FUSER MEMBER WITH FLUOROPOLYMER, SILICONE AND ALUMINA COMPOSITE LAYER

BACKGROUND OF THE INVENTION

The present invention relates to a fuser member and method for fusing toner images in electrostatographic reproducing, including digital and image on image, apparatuses. The fuser member is especially useful for fusing color images. More specifically, the present invention relates to apparatuses directed towards fusing toner images using a fuser member having a fluoropolymer layer with fillers that promote thermal conductivity such as a) aluminum oxide of varying particle sizes and b) silicone materials. In a preferred embodiment, aluminum oxide of at least two different particle sizes is dispersed or contained in the fluoropolymer layer, along with crosslinked and/or cured silicone particles. In a particularly preferred embodiment, the fuser member has an outer layer comprising a fluoropolymer, silicone particle, and alumina particles of at least two different sizes.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes it to be firmly bonded to the support.

Several approaches to thermal fusing of electroscopic toner images have been described. These methods include providing the application of heat and pressure substantially concurrently by various means, a roll pair maintained in pressure contact, a belt member in pressure contact with a roll, a belt member in pressure contact with a heater, and the like. Heat may be applied by heating one or both of the rolls, plate members, or belt members.

Known fuser members include those with outer layers of polytetrafluoroethylene to which a release agent such as silicone oil has been applied. More recently, silicone rubber and fluoroelastomers such as VITON® (Trademark from E.I. DuPont) coated fuser members have been used to enhance copy quality. The following are known fuser members.

U.S. Pat. No. 5,595,823 discloses a fuser member having a layer including a cured fluorocarbon random copolymer having subunits of vinylidene fluoride, hexafluoropropylene and tetrafluoroethylene and having aluminum oxide filler along with alkali metal oxides and/or alkali metal hydroxide fillers incorporated into the fuser member layer. A polydimethylsiloxane and mercapto fuser oil are also disclosed.

U.S. Pat. No. 4,711,818 discloses a fuser member having a core, and an outer layer comprising a crosslinked product of a mixture of at least one addition curable vinyl terminated or vinyl pendant polyfluoroorganosiloxane, heat stabilizer, filler, crosslinking agent and crosslinking catalyst. The filler may be calcined or tabular alumina.

U.S. Pat. No. 5,729,813 discloses a fuser member having a core and a surface layer comprising a fluoroelastomer and an alumina filler present in an amount of from about 30 to about 55 parts by weight, which corresponds to from about 11 to about 20 volume percent alumina. There may be present an intermediate silicone layer.

U.S. Pat. No. 5,292,606 discloses a fuser member having a base cushion layer comprising polydimethyl siloxane and at least one outer layer, wherein zinc oxide is present in the base cushion layer. The reference discloses that the zinc oxide particles can be replaced with aluminum oxide particles in a preferred amount of 8 to 40 volume percent.

U.S. Pat. No. 4,257,699 discloses a fuser member having a core and two outer layers. Example 1 discloses a base member, a silicone intermediate layer containing aluminum oxide particles, and an outer silicone rubber layer containing silver particles.

For developing color images, several layers of different color toner are deposited on the latent image resulting in extra thickness (higher toner pile height) of unfused toner on a color image. Increased thermal conductivity is necessary in order to provide higher temperatures for fusing the increased amount of toner, without excess use of energy. Improved release, either by extra release agent and/or improved surface release properties, is necessary for improving toner release due to the increase in toner used for color developing. Further, extended dwell time at the nip is necessary to ensure complete toner flow. In addition, a conformable fuser member is necessary in order to ensure sufficient release and stripping. Moreover, a smooth surface is necessary in order to provide color images with preferred increased gloss which is normally customer preferred for color prints.

However, known fuser members do not provide the same quality for colored images as they do for black and white images. Therefore, it is desired to provide a fuser member, preferably in combination with a pressure member, wherein high quality color prints or copies are produced. Particularly, it is desired to provide fuser members demonstrating excellent results at the higher temperatures necessary in color fusing by possessing increased thermal conductivity and release properties. It is further desirable to provide fuser members possessing smooth, conformable layers having a long-dwell nip and a decrease in swell. Moreover, it is desirable to provide fusing layers which are more easily processable.

SUMMARY OF THE INVENTION

In embodiments, the present invention relates to: a fuser member comprising: a) a substrate, and b) a thermally conductive fusing layer comprising a fluoropolymer, a micron-sized alumina, a high surface area alumina having a particle size smaller than that of the micron-sized alumina, and a crosslinked silicone particle.

Embodiments of the present invention further include: an image forming apparatus for forming images on a recording medium comprising: a charge-retentive surface to receive an electrostatic latent image thereon; a development component to apply toner to the charge-retentive surface to develop the electrostatic latent image to form a developed image on the charge retentive surface; a transfer component to transfer the developed image from the charge retentive surface to a copy substrate; and a fuser member for fusing toner images to a surface of the copy substrate, wherein the fuser member comprises: a) a substrate, and b) a thermally conductive fusing layer comprising a fluoropolymer, a micron-sized alumina, a high surface area alumina having a particle size smaller than that of the micron-sized alumina, and a crosslinked silicone particle.

Embodiments also include: a fusing apparatus for fusing color toner, comprising a fuser member in pressure contact with a pressure member, wherein at least one of the fuser member and pressure member comprises a) a substrate; and b) a thermally conductive fusing layer comprising a fluoropolymer, a micron-sized alumina, a high surface area alumina having a particle size smaller than that of the micron-sized alumina, and a crosslinked silicone particle.

BRIEF DESCRIPTION OF THE DRAWINGS

For a better understanding of the present invention, reference may be had to the accompanying figures.

DETAILED DESCRIPTION OF THE PRESENT INVENTION

The fuser members disclosed herein are particularly useful in color duplication and printing, including digital, machines. The fuser members demonstrate excellent results at the higher temperatures, for example from about 150 to about 180° C., necessary in color fusing. The fuser members provide for an increase in thermal conductivity and release, and are further easily processable. The fuser members possess smooth, conformable layers having a decrease in swell.

Figure 1:
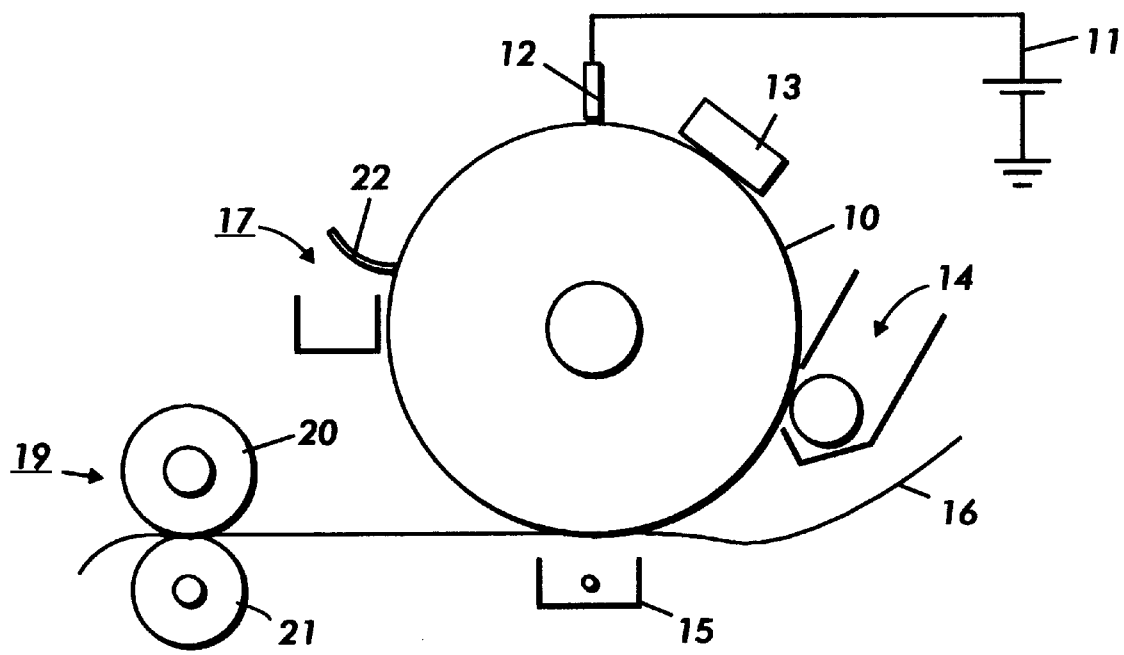
FIG. 1 is an illustration of a general electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
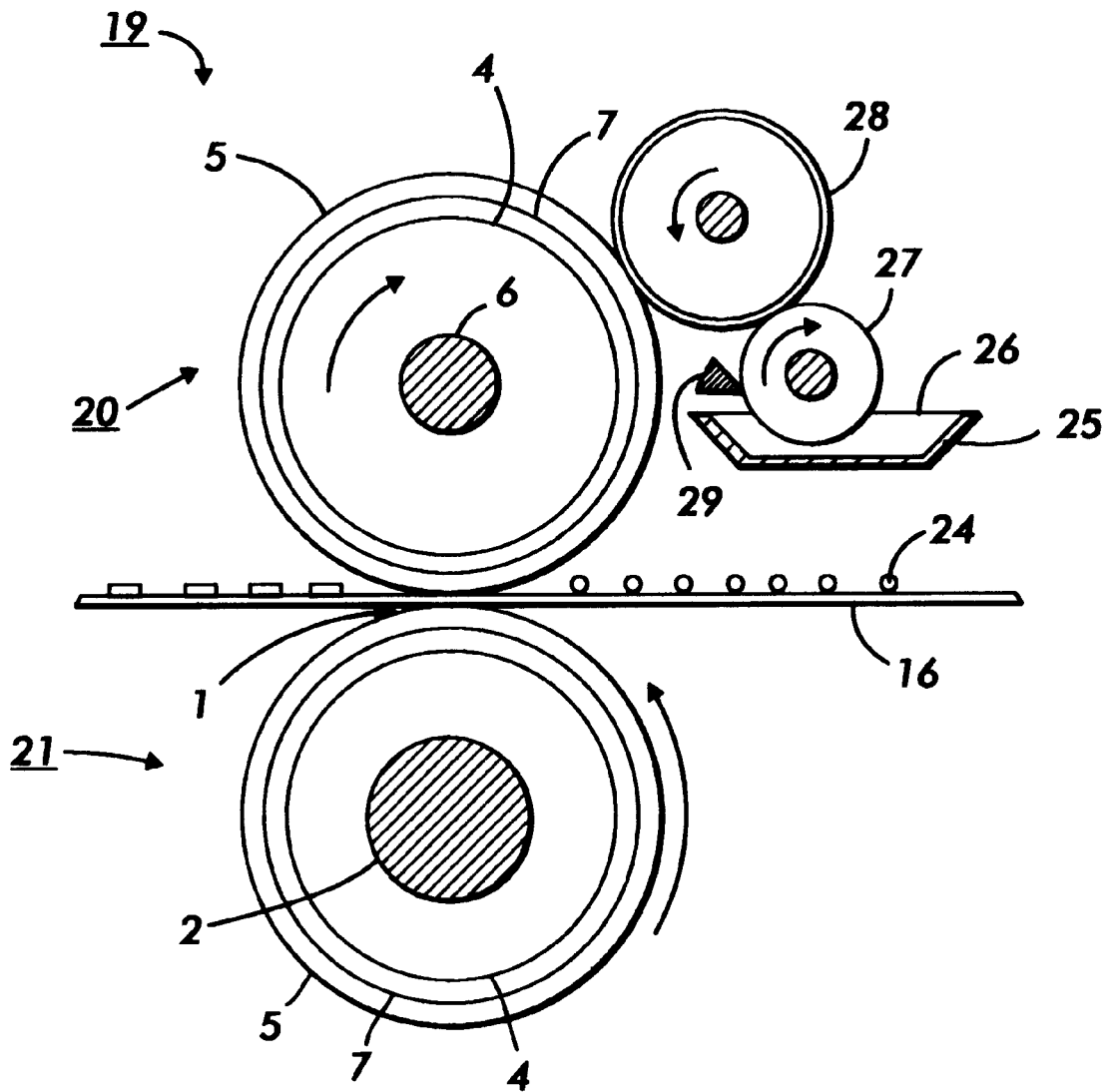
FIG. 2 illustrates a fusing system in accordance with an embodiment of the present invention.

Referring to FIG. 2, an embodiment of a fusing station 19 is depicted with an embodiment of a fuser roll 20 comprising fluoropolymer surface 5 upon a suitable base member 4, a hollow cylinder or core fabricated from any suitable metal, such as aluminum, anodized aluminum, steel, nickel, copper, and the like, having a suitable heating element 6 disposed in the hollow portion thereof which is coextensive with the cylinder. The fuser member 20 can include an adhesive, cushion, or other suitable layer 7 positioned between core 4 and outer layer 5. Backup or pressure roll 21 cooperates with fuser roll 20 to form a nip or contact arc 1 through which a copy paper or other substrate 16 passes such that toner images 24 thereon contact elastomer surface 5 of fuser roll 20. As shown in FIG. 2, an embodiment of a backup roll or pressure roll 21 is depicted as having a rigid steel core 2 with the same or similar layers as positioned on the fuser member 20, including fluoropolymer surface 5 positioned upon an optional adhesive, cushion or other suitable layer 7, which, in turn, is positioned upon a suitable base member 4. Sump 25 contains polymeric release agent 26 which may be a solid or liquid at room temperature, but it is a fluid at operating temperatures. The pressure member 21 may include a heating element (not shown).

In the embodiment shown in FIG. 2 for applying the polymeric release agent 26 to polymer or elastomer surface 5, two release agent delivery rolls 27 and 28 rotatably mounted in the direction indicated are provided to transport release agent 26 to polymer or elastomer surface 5. Delivery roll 27 is partly immersed in the sump 25 and transports on its surface release agent from the sump to the delivery roll 28. By using a metering blade 29, a layer of polymeric release fluid can be applied initially to delivery roll 27 and subsequently to polymer or elastomer 5 in controlled thickness ranging from submicrometer thickness to thicknesses of several micrometers of release fluid. Thus, by metering device 29, preferably from about 0.1 to about 2 micrometers or greater thicknesses of release fluid can be applied to the surface of polymer or elastomer 5.

Figure 3:
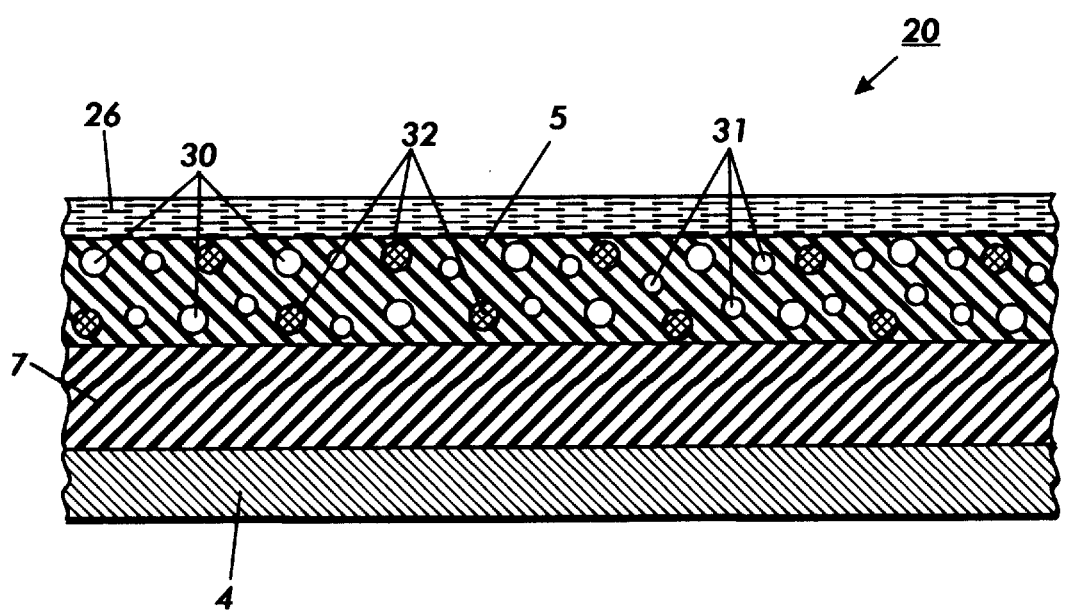
FIG. 3 demonstrates a cross-sectional view of an embodiment of the present invention.

FIG. 3 depicts a cross-sectional view of a preferred embodiment of the invention, wherein fuser member 20 comprises substrate 4, intermediate surface layer 7, and outer fluoropolymer surface layer 5. FIG. 3 also depicts optional fluid release agent or fusing oil layer 26. In addition, the fillers of the fluoropolymer layer are depicted and include micron-sized alumina particles 30, high surface area alumina particles 31 which have a particle size smaller than that of alumina 30, and crosslinked silicone particles 32 dispersed or contained in the fluoropolymer layer 5.

Fuser member as used herein refers to fuser members including fusing rolls, belts, films, sheets and the like; donor members, including donor rolls, belts, films, sheets and the like; and pressure members, including pressure rolls, belts, films, sheets and the like; and other members useful in the fusing system of an electrostatographic or xerographic, including digital, machine. The fuser member of the present invention may be employed in a wide variety of machines and is not specifically limited in its application to the particular embodiment depicted herein.

Any suitable substrate may be selected for the fuser member. The fuser member substrate may be a roll, belt, flat surface, sheet, film, or other suitable shape used in the fixing of thermoplastic toner images to a suitable copy substrate. It may take the form of a fuser member, a pressure member or a release agent donor member, preferably in the form of a cylindrical roll. Typically, the fuser member is made of a hollow cylindrical metal core, such as copper, aluminum, stainless steel, or certain plastic materials chosen to maintain rigidity, structural integrity, as well as being capable of having a polymeric material coated thereon and adhered firmly thereto. It is preferred that the supporting substrate is a cylindrical metal roller. In one embodiment, the core, which may be an aluminum or steel cylinder, is degreased with a solvent and cleaned with an abrasive cleaner prior to being primed with a primer, such as Dow Corning 1200, which may be sprayed, brushed or dipped, followed by air drying under ambient conditions for thirty minutes and then baked at 150° C. for 30 minutes.

Examples of suitable outer fusing layers of the fuser member herein include polymers such as fluoropolymers. Particularly useful fluoropolymer coatings for the present invention include TEFLON®-like materials such as polytetrafluoroethylene (PTFE), fluorinated ethylenepropylene copolymer (FEP), perfluorovinylalkylether tetrafluoroethylene copolymer (PFA TEFLON®), polyethersulfone, copolymers and terpolymers thereof, and the like. Also preferred are fluoroelastomers such as those described in detail in U.S. Pat. Nos. 5,166,031; 5,281,506; 5,366,772; 5,370,931; 4,257,699; 5,017,432; and 5,061,965, the disclosures each of which are incorporated by reference herein in their entirety. These fluoroelastomers, particularly from the class of copolymers, terpolymers, and tetrapolymers of vinylidenefluoride, hexafluoropropylene and tetrafluoroethylene and a possible cure site monomer, are known commercially under various designations as VITON A®, VITON E®, VITON E60C®, VITON E430®, VITON 910®, VITON GH® VITON GF®, VITON E45®, VITON A201C®, and VITON B50®. The VITON® designation is a Trademark of E.I. DuPont de Nemours, Inc. Other commercially available materials include FLUOREL 2170®, FLUOREL 2174®, FLUOREL 2176®, FLUOREL 2177® and FLUOREL LVS 76® FLUOREL® being a Trademark of 3M Company. Additional commercially available materials include AFLAS® a poly(propylenetetrafluoroethylene) and FLUORELII® (LII900) a poly(propylene-tetrafluoroethylenevinylidenefluoride) both also available from 3M Company, as well as the TECNOFLONS® identified as FOR-60KIR®, FOR-LHF®, NM® FOR-THF®, FOR-TFS®, TH®, TN505® available from Montedison Specialty Chemical Company. In another preferred embodiment, the fluoroelastomer is one having a relatively low quantity of vinylidenefluoride, such as in VITON GF®, available from E.I. DuPont de Nemours, Inc. The VITON GF® has about 35 weight percent of vinylidenefluoride, about 34 weight percent of hexafluoropropylene and about 29 weight percent of tetrafluoroethylene with about 2 weight percent cure site monomer. The cure site monomer can be those available from DuPont such as 4-bromoperfluorobutene-1,1,1 -dihydro-4-bromoperfluorobutene-1,3-bromoperfluoropropene-1,1,1-dihydro-3-bromoperfluoropropene-1, or any other suitable, known, commercially available cure site monomer.

It has been determined that fluoropolymer and especially fluoroelastomer materials such as the VITON® materials just listed, are beneficial when used as fuser roll coatings at normal fusing temperatures (e.g., from about 50 to about 150° C.). These materials have the superior properties of high temperature stability, thermal conduction, wear resistance, and release oil swell resistance. However, at increased temperatures necessary for color fusing (e.g., from about of from about 155 to about 180° C.), toner release is not acceptable. Toner offset has been found to occur which results in contamination of other parts of the machine, and which results in a decrease in the life of the fusing member.

The addition of silicone particles to the fluoropolymer layer increases release of toner from the fuser member during and following the fusing process, even in color machines wherein the fusing temperature must be much higher than machines using black and white toner, and wherein there is a sufficiently greater amount of toner used.

Crosslinked or cured silicone particles are dispersed or contained in the fluoropolymer layer. The crosslinked silicone is present in the fluoropolymer layer in an amount of from about 1 to about 65 percent, preferably from about 2 to about 50 percent, and particularly preferred from about 5 to about 40 volume percent by total volume of the fluoropolymer layer. If there are too many silicone particles present in the elastomer, the elastomer becomes difficult to process on a two roll mill. This happens because the material becomes slippery due to optional coating of the silicone oil which results in insufficient banding. The silicone particles can contain epoxy and/or amino groups. Examples of suitable crosslinked and/or cured silicone particles include Dow Corning's E600, E601, and E602.

In order to increase the thermal conductivity, it is preferred to disperse or contain in the outer fluoropolymer layer, a thermally conductive filler such as a metal oxide. Examples of suitable metal oxides include copper oxide, aluminum oxide, iron oxide, zinc oxide and the like. However, the thermal conductivity is increased significantly by addition of aluminum oxide, and in preferred embodiments, two different particle sized aluminum oxides. It is preferred that a micron-sized alumina having a particle size of from about 1 to about 100 microns, preferably from about 1 to about 20 microns is present in the fluoropolymer layer in an amount of from about 10 to about 20 percent, preferably from about 15 to about 20 volume percent by total volume of the outer fluoropolymer layer. Examples of the micron-sized alumina include KC Abrasives 1 micron alumina and other known micron-sized alumina having the above particle size.

In order to facilitate processing of the silicone powder while also serving to further improve thermal conductivity and release, it is preferred to have included in the fluoropolymer layer in addition to the micron-sized alumina and silicone particles, a smaller particle sized alumina having a high surface area. In addition to improving processability and thermal conductivity, the high surface area alumina is thought to absorb some residual silicone oil in the silicone particles. This oil could make processing the formulation difficult in normal rubber processing. Therefore, absorbing some of the residual silicone oil is helpful for processing. Further, by possessing the ability to bond to functional release agents, the high surface area alumina increases toner release.

The high surface area alumina has a particle size of less than about 1 micron, preferably from about 0.01 to about 0.8 micron, and particularly preferred of from about 0.01 to about 0.5 micron. The high surface energy alumina is present in an amount of less than about 15 volume percent, preferably from about 0.01 to about 10 volume percent, and particularly preferred of from about 1 to about 5 volume percent by total volume of the outer fluoropolymer layer. Examples of suitable high surface area alumina include Alumina C from Degusa and CR125 from Bailkowski International Corporation, and other known high surface area aluminas having the above particle size.

In addition to increasing thermal conductivity and release, and enhancing processability, the addition of the silicone and two types of alumina particles in embodiments as described above, may provide for an increase in abrasion resistance. Further, by providing the fluoropolymer/silicone/alumina outer surface on both the fuser member and the pressure member, there will be provided a decrease in temperature difference between the inside and outside of the paper path, permitting use of a lower core temperature and thereby increasing the life of both the fuser and pressure members.

The fluoropolymer/silicone/alumina layer also provides for a decrease in swell which is normally caused by use of silicone oils. This problem is normally common to fuser and pressure members that have a continuous silicone phase. Since the silicone material in the embodiments described herein, is present in small particulate form, it is forced to be in the dispersed phase, thus assuring that the continuous phase is the fluoropolymer. Therefore, the silicone phase will be protected from swelling by a silicone or functional silicone release agent.

Other adjuvants and fillers may be incorporated in the layers in accordance with the present invention provided that they do not affect the integrity of the fluoropolymer material. Such fillers normally encountered in the compounding of elastomers include coloring agents, reinforcing fillers, and processing aids. Oxides such as magnesium oxide and hydroxides such as calcium hydroxide are suitable for use in curing many fluoropolymers. Moreover, in order to further increase processability of the fluoropolymer by further absorbing silicone oil (as is one function of the high surface area alumina), fillers such as fumed silica or clays such as organo-montmorillonites can be added in order to further facilitate processing.

In another embodiment, silicone oil may be added to the aluminum oxides in order to increase release even more. This may also be accomplished by absorbing silicone oil onto the high surface area submicron alumina or other oil absorbing particles followed by its addition to the fluoropolymer compositions.

It is preferred that the outer fusing layer be coated to a thickness of from about 15 to about 30 microns, preferably from about 20 to about 25 microns.

There may be included an optional intermediate layer positioned between the substrate an the outer fluoropolymer/silicone/alumina layer. The intermediate layer preferably comprises a silicone rubber of a thickness so as to form a conformable layer. Suitable silicone rubbers include room temperature vulcanization (RTV) silicone rubbers; high temperature vulcanization (HTV) silicone rubbers and low temperature vulcanization (LTV) silicone rubbers. These rubbers are known and readily available commercially such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the siloxanes (preferably polydimethylsiloxanes) such as, fluorosilicones, dimethylsilicones, liquid silicone rubbers such as vinyl crosslinked heat curable rubbers or silanol room temperature crosslinked materials, and the like.

In general, the intermediate layer has a thickness of from about 0.05 to about 10 mm, preferably from about 0.1 to about 7 mm, and preferably from about 1 to about 5 mm. More specifically, if the intermediate layer is present on a pressure member, it has a thickness of from about 0.05 to about 10 mm, preferably from about 0.1 to about 7 mm, and particularly preferred from about 1 to about 5 mm. When present on a fuser member, the intermediate layer has a thickness of from about 1 to about 10 mm, preferably from about 2 to about 7 mm, and particularly preferred from about 2.5 to about 5 mm. In a preferred embodiment, the thickness of the intermediate layer of the fuser member is higher than that of the pressure member so that, the fuser member is more deformable than the pressure member.

Other layers such as adhesive layers or other suitable layers may be incorporated between the outer layer and the intermediate layer in embodiments, or between the substrate and the intermediate layer in embodiments.

The polymer layers of the present invention can be coated on the fuser member substrate by any means including normal spraying, dipping and tumble spraying techniques. A flow coating apparatus as described in U.S. application Ser. No. 08/672,493 filed Jun. 26, 1996, entitled, "Flow Coating Process for Manufacture of Polymeric Printer Roll and Belt Components," the disclosure of which is hereby incorporated herein in its entirety, can also be used to flow coat a series of fuser rolls. It is preferred that the polymers be diluted with a solvent, and particularly an environmentally friendly solvent, prior to application to the fuser substrate. However, alternative methods can be used for coating layer including methods described in U.S. Pat. No. 6,099,673, the disclosure of which is hereby incorporated by reference in its entirety.

Polymeric fluid release agents can be used in combination with the outer layer to form a layer of fluid release agent which results in an interfacial barrier at the surface of the fuser member while leaving a non-reacted high surface area release fluid as an outer release film. Suitable release agents include both functional and non-functional fluid release agents. Preferred are the functional release agents including known polydimethyl siloxane release agents having amino-, mercapto-, hydride- or other suitable functionality. Specific examples of suitable amino functional release agents include T-Type amino functional silicone release agents disclosed in U.S. Pat. No. 5,516,:361; monoamino functional silicone release agents described in U.S. Pat. No. 5,531,813; and the amino functional siloxane release agents disclosed in U.S. Pat. No. 5,512,409, the disclosures each of which are incorporated herein in their entirety. Examples of mercapto functional release agents include those disclosed in U.S. Pat. Nos. 4,029,827; 4,029,827; and 5,395,725. Examples of hydride functional oils include U.S. Pat. No. 5,401,570. Other functional release agents include those described in U.S. Pat. Nos. 4,101,686; 4,146,659; and 4,185,140. Other release agents include those described in U.S. Pat. Nos. 4,515,884; and 5,493,376. However, it is preferred to use a non-functional release agent with the present fuser configuration.

The fuser members are useful in combination with many toners, including black and white toner or color toner. However, the fuser members herein are particularly useful with color toners. Examples of suitable known color toners include those listed in U.S. Pat. Nos 5,620,820; 5,719,002; and 5,723,245.

The fuser members disclosed herein are particularly useful in color duplication and printing, including digital, machines. The fuser members demonstrate excellent results at the higher temperatures, for example from about 150 to about 180° C., necessary in color fusing. The fuser members provide for an increase in thermal conductivity and release, and are further easily processable. The fuser members possess smooth, conformable layers having a decrease in swell.

All the patents and applications referred to herein are hereby specifically, and totally incorporated herein by reference in their entirety in the instant specification.

The following Examples further define and describe embodiments of the present invention. Unless otherwise indicated, all parts and percentages are by weight of total solids as defined in the specification. Percentage by total volume refers to the amount per total volume of all the components in the particular layer.

EXAMPLES

Example I

Layer Prepared With Fluoroelastomer. Crosslinked Silicone Particle and Micron-size Alumina The following formulation was attempted to be mixed on a standard laboratory 2-roll rubber mill:

| Material | Parts by Weight |
| --- | --- |
| DuPont VITON ® GF | 100.0 |
| Dow Corning E600 | 13.5 |
| KC Abrasives' 1 μm alumina | 51.4 |
| MgO | 3.0 |
| Ca(OH)$_2$ | 6.0 |
| VITON ® Curative 50 | 5.0 |

When it was attempted to add the Dow Corning E600 crosslinked, micron-size silicone rubber particles along with the KC Abrasives' 1 μm alumina to the VITON® GF which was already banded on the 2-roll rubber mill, a problem arose. The compounded material developed a slippery feel and would not remain banded to either roll of the 2-roll rubber mill and the mixing process had to be stopped. The hypothesis was that low molecular weight silicone material present within the crosslinked silicone particles was blooming to the surface of the VITON® GF and preventing it from adhering to either of the rolls of the 2-roll rubber mill.

Example II

Layer Prepared With Fluoroelastomer, Crosslinked Silicone Particle, Micron-size Alumina, and High Surface Area Alumina The following formulation was mixed on a standard 2-roll rubber mill:

| Materials | Parts by Weight |
| --- | --- |
| DuPont VITON ® GF | 100.0 |
| Dow Corning E600 | 13.5 |
| Degussa submicron alumina C | 0.5 |
| KC Abrasives' 1 μm alumina | 51.4 |
| MgO | 3.0 |
| Ca(OH)2 | 6.0 |
| VITON ® Curative 50 | 5.0 |

Prior to mixing any of the fillers into the VITON® GF on the 2-roll rubber mill, the alumina fillers plus the crosslinked silicone rubber particles were first mixed together. The 1 μm KC Abrasives alumina and the E600 crosslinked, micron-size silicone rubber particles were blended together with ⅜" diameter ceramic spheres for 18 hours in a roll mill ceramic jar. The ceramic spheres were then separated from the alumina plus silicone rubber particles by means of 2000 μm mesh screen. The submicron, Degussa alumina C was added to the recovered blend of 1 μm alumina and silicone rubber particles and the mixture was blended together in a glass jar on a roll mill for about an hour. The alumina fillers plus silicone rubber particles were then added to VITON® GF, which was first milled and banded onto a 2-roll rubber mill. Upon addition of the fillers, the compound remained on the mill and did not exhibit the slippery feel and non-adherence of the compound mentioned in Example 1.

Example III

Fuser Members Coated With Layer of Fluoroelastomer, Crosslinked Silicone Particles, Micron-size Alumina, and High Surface Area Alumina Fuser rolls can be coated with the materials prepared as set forth in Example II. It is expected that the incorporated silicone particles would continue to release low molecular weight silicone material which would diffuse to the fluoropolymer surface and improve toner release.

While the invention has been described in detail with reference to specific and preferred embodiments, it will be appreciated that various modifications and variations will be apparent to the artisan. Unless otherwise specified, all amounts are percentages by weight of total solids. All such modifications and embodiments as may occur to one skilled in the art are intended to be within the scope of the appended claims.

We claim:

1. A fuser member comprising: a) a substrate, and b) a thermally conductive fusing layer comprising a fluoropolymer, a first alumina, a second alumina having a particle size smaller than that of said first alumina, and crosslinked silicone particles.

2. A fuser member in accordance with claim 1, wherein said fluoropolymer is a fluoroelastomer selected from the group consisting of a) copolymers of vinylidenefluoride, hexafluoropropylene and tetrafluoroethylene, b) terpolymers of vinylidenefluoride, hexafluoropropylene and tetrafluoroethylene, and c) tetrapolymers of vinylidenefluoride, hexafluoropropylene, tetrafluoroethylene and a cure site monomer.

3. A fuser member in accordance with claim 2, wherein said fluoroelastomer comprises about 35 weight percent of vinylidenefluoride, about 34 weight percent of hexafluoropropylene, about 29 weight percent tetrafluoroethylene, and about 2 weight percent cure site monomer.

4. A fuser member in accordance with claim 1, wherein said first alumina has a particle size of from about 1 to about 100 microns.

5. A fuser member in accordance with claim 4, wherein said first alumina has a particle size of from about 1 to about 20 microns.

6. A fuser member in accordance with claim 1, wherein said first alumina is present in the fluoropolymer layer in an amount of from about 10 to about 20 volume percent by total volume of said fluoropolymer layer.

7. A fuser member in accordance with claim 6, wherein said first alumina is present in the fluoropolymer layer in an amount of from about 15 to about 20 volume percent by total volume of said fluoropolymer layer.

8. A fuser member in accordance with claim 1, wherein said second alumina has a particle size of less than about 1 micron.

9. A fuser member in accordance with claim 8, wherein said second alumina has a particle size of from about 0.01 to about 0.8 micron.

10. A fuser member in accordance with claim 1, wherein said second alumina is present in the fluoropolymer layer in an amount of less than about 15 volume percent by total volume of said outer fluoropolymer layer.

11. A fuser member in accordance with claim 10, wherein said second alumina is present in the fluoropolymer layer in an amount of from about 0.01 to about 10 volume percent by total volume of the fluoropolymer layer.

12. A fuser member in accordance with claim 1, wherein said crosslinked silicone particles are present in the fluoropolymer layer in an amount of from about 1 to about 65 volume percent by total volume of the fluoropolymer layer.

13. A fuser member in accordance with claim 12, wherein said crosslinked silicone particles are present in the fluoropolymer layer in an amount of from about 2 to about 50 volume percent by total volume of the fluoropolymer layer.

14. A fuser member in accordance with claim 1, wherein said crosslinked silicone particles comprise epoxy groups, amino groups, or both epoxy and amino groups.

15. A fuser member in accordance with claim 1, wherein said fluoropolymer layer further comprises silicone oil.

16. A fuser member in accordance with claim 1, wherein said fluoropolymer layer has a thickness of from about a 15 to about 30 microns.

17. A fuser member in accordance with claim 16, wherein said fluoropolymer layer has a thickness of from about 20 to about 25 microns.

18. A fuser member in accordance with claim 1, wherein an intermediate layer is positioned between said substrate and said fluoropolymer layer.

19. A fuser member in accordance with claim 18, wherein said intermediate layer comprises a silicone rubber.

20. A fuser member in accordance with claim 18, wherein said intermediate layer has a thickness of from about 0.05 to about 10 mm.

21. A fuser member in accordance with claim 1, further comprising a fluid release layer over said fluoropolymer layer.

22. A fuser member in accordance with claim 1, wherein said fuser member is a cylindrical fuser roller.

23. A fuser member in accordance with claim 1, wherein said substrate is in the form of a belt.

24. A fuser member in accordance with claim 1, wherein said fuser member is a cylindrical pressure roller.

25. An image forming apparatus for forming images on a recording medium comprising:
   a charge-retentive surface to receive an electrostatic latent image thereon;
   a development component to apply toner to said charge-retentive surface to develop said electrostatic latent image to form a developed image on said charge retentive surface;
   a transfer component to transfer the developed image from said charge retentive surface to a copy substrate; and
   a fuser member for fusing toner images to a surface of said copy substrate, wherein said fuser member comprises: a) a substrate, and b) a thermally conductive fusing layer comprising a fluoropolymer, a first alumina, a second alumina having a particle size smaller than that of said first alumina, and crosslinked silicone particles.

26. An image forming apparatus in accordance with claim 25, wherein said toner is a color toner.

27. A fuser apparatus for fusing color toner, comprising a fuser member in pressure contact with a pressure member, wherein at least one of said fuser member and pressure member comprises: a fuser member comprising: a) a substrate, and b) a thermally conductive fusing layer comprising a fluoropolymer, a first alumina, second alumina having a particle size smaller than that of said first alumina, and crosslinked silicone particles.

28. A fuser apparatus in accordance with claim 27, wherein both of said fuser member and pressure member comprise: a) a substrate, and b) a thermally conductive fusing layer comprising a fluoropolymer, a first alumina, a second alumina having a particle size smaller than that of said first alumina, and crosslinked silicone particles.

* * * * *